United States Patent
Babu

(10) Patent No.: US 9,860,585 B2
(45) Date of Patent: Jan. 2, 2018

(54) DVR CONFLICT RESOLUTION

(71) Applicant: Narendra B. Babu, Chennai (IN)

(72) Inventor: Narendra B. Babu, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

(21) Appl. No.: 13/909,306

(22) Filed: Jun. 4, 2013

(65) Prior Publication Data
US 2014/0355963 A1     Dec. 4, 2014

(51) Int. Cl.
| | |
|---|---|
| *H04N 5/76* | (2006.01) |
| *H04N 21/433* | (2011.01) |
| *H04N 21/258* | (2011.01) |
| *H04N 21/45* | (2011.01) |
| *H04N 21/458* | (2011.01) |
| *H04N 21/472* | (2011.01) |
| *H04N 21/4147* | (2011.01) |

(52) U.S. Cl.
CPC ... *H04N 21/4334* (2013.01); *H04N 21/25891* (2013.01); *H04N 21/4532* (2013.01); *H04N 21/4583* (2013.01); *H04N 21/47214* (2013.01); *H04N 21/4147* (2013.01)

(58) Field of Classification Search
CPC ..................... H04N 21/4583; H04N 21/4147
USPC ................................... 386/291, 292; 725/46
See application file for complete search history.

(56) References Cited

U.S. PATENT DOCUMENTS

| | | | | |
|---|---|---|---|---|
| 7,895,625 | B1 * | 2/2011 | Bryan ................... | H04N 5/782 725/46 |
| 8,160,426 | B2 * | 4/2012 | Craner et al. ................. | 386/292 |
| 8,582,957 | B2 * | 11/2013 | Taxier et al. ................. | 386/291 |
| 8,689,266 | B2 * | 4/2014 | Bhogal et al. ................. | 725/86 |

* cited by examiner

*Primary Examiner* — Thai Tran
*Assistant Examiner* — Jose Mesa

(57) ABSTRACT

A method includes receiving an indication of a DVR conflict that includes at least two conflicting video programs. The method also includes identifying attributes of the conflicting video programs, and identifying a local pattern of DVR conflict resolution associated with a user based on the conflicting video programs. The method includes identifying, if the conflicting video programs do not match the local pattern, a global pattern of DVR conflict resolution associated with multiple customers of a service provider based on the conflicting video programs, identifying, if the conflicting video programs do not match the global pattern, a default pattern of DVR conflict resolution, and scheduling at least one of the conflicting video programs to be recorded based on the identified local, global, or default pattern of DVR conflict resolution.

20 Claims, 8 Drawing Sheets

| 1ST VIDEO PROGRAM | 2ND VIDEO PROGRAM | TIME OF CONFLICT | DECISION |
|---|---|---|---|
| COMEDY, REBROADCAST | DOCUMENTARY | 4/20/13 7:30 PM | RECORD A |
| COMEDY, FIRST BROADCAST | ACTION MOVIE, ACTOR A | 4/21/13 3:00 PM | RECORD A |
| ACTION MOVIE, ACTOR A | COMEDY REBROADCAST | 4/23/13 7:30 PM | RECORD A |
| COMEDY, REBROADCAST | COMEDY REBROADCAST | 4/23/13 10:00 AM | RECORD A |
| COOKING SHOW | MUSIC SHOW | 4/25/13 12:00 AM | RECORD A |
| SPORTS EVENT, LIVE | COMEDY, FIRST BROADCAST | 4/27/13 8:00 PM | RECORD A |
| SPORTS EVENT, LIVE | ACTION MOVIE, ACTOR B | 4/27/13 8:30 PM | RECORD A |
| SPORTS EVENT, LIVE | COMEDY, REBROADCAST | 4/27/13 9:00 PM | RECORD A |
| SPORTS EVENT, LIVE | HORROR MOVIE | 4/27/13 9:30 PM | CANCEL BOTH |
| SPORTS RECAP | COMEDY, REBROADCAST | 4/29/13 12:14 AM | RECORD A |
| SPORTS RECAP | COMEDY, REBROADCAST | 4/30/13 12:14 AM | RECORD A |

FIG. 5

DVR CONFLICT RESOLUTION

BACKGROUND INFORMATION

Set top boxes may include tuners that receive audio visual feeds from a video service provider and digital video recorders (DVRs) that record the audio visual feeds. The users of a set top box may schedule the DVR to record more video programs than there are available DVRs and/or tuners. Set top boxes are known to implement DVR conflict resolution methods that require the user's input to select the best choice when a tuner conflict occurs. Today's DVR conflict resolution methods typically wait for the user input to the resolve the conflict and, in the absence of users' input, resolves the conflict based on a default schedule.

BRIEF DESCRIPTION OF THE DRAWINGS

FIG. 5 is a table of exemplary local DVR conflict resolution information;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein relate to devices, methods, and systems for implementing DVR conflict resolution. In one implementation, the system collects indicators of the viewing habits of the users, and analyzes the indicators of viewing habits to understand the preferences of the user. The system also identifies global patterns of DVR conflict resolution from the viewing habits of multiple users (i.e., multiple customer premises). The system analyzes this information to determine the most popular programs across the multiple users. The system may resolve DVR conflicts based on the local pattern and/or the global pattern of DVR conflict resolution. The system may implement conflict resolution based on the local and/or global pattern without direct input from the user.

Consistent with the embodiments described herein, parts of local pattern preferences may be determined based on a local DVR delete pattern. The system may take into account future scheduled instances of programs scheduled for recording in implementing DVR conflict resolution.

Figure 1:
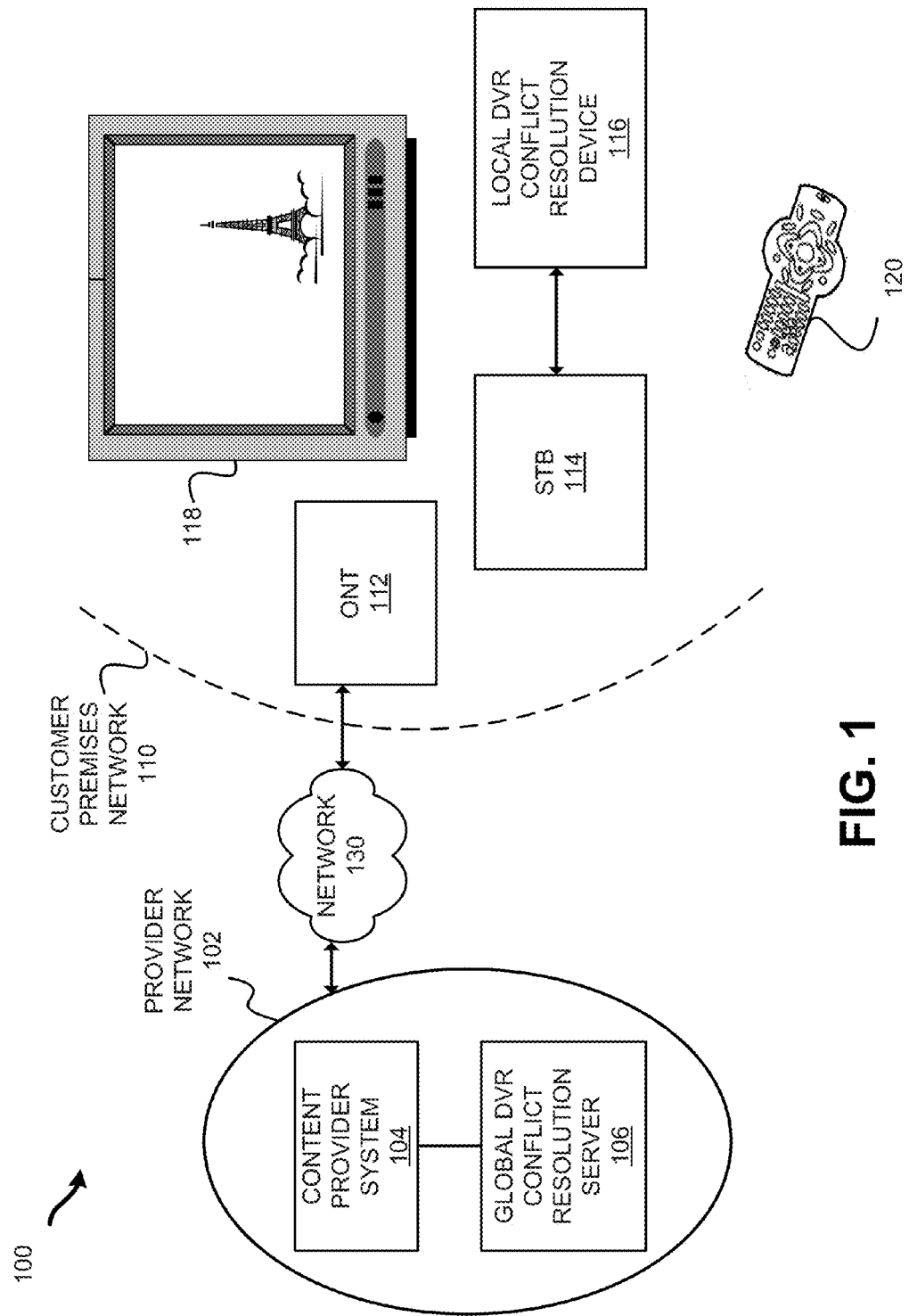
FIG. 1 illustrates an exemplary network in which systems and methods described herein may be implemented.

FIG. 1 is a diagram of an exemplary network 100 in which systems and/or methods described herein may be implemented. As illustrated, network 100 may include a provider network 102 and a customer premises network 110. Provider network 102 may include a content provider system 104 and a global DVR conflict resolution server 106. Customer premises network 110 (e.g., the customer's home) may include an optical network terminal (ONT) 112, a set-top box (STB) 114, a local DVR conflict resolution device 116, a TV 118, and a remote control 120. Provider network 102 and customer premises network 110 may be interconnected by network 130. Components of network 100 may be interconnected via wired and/or wireless connections. The configuration of components of network 100 illustrated in FIG. 1 is for illustrative purposes only. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

Provider network 102 may provide service and support for a video content service associated with a video service provider. For example, in addition to video content, provider network may provide billing, applications, customer service, authentication, etc., for customers of the video content service. Provider network 102 may include one or more servers and one or more memory/storage devices. As shown in FIG. 1, provider network 102 includes content provider system 104 and global DVR conflict resolution server 106.

Content provider system 104 may collect, generate, and provide video content to subscribers/recipients of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. Content provider system 104 may provide media content to customer premises network 110. Additionally, content provider system 104 may provide metadata associated with the media content. According to one embodiment, content provider system 104 provides scheduled media content on a subscription and/or pay per view basis. Content provider system 104 may provide the video programs (e.g., to customer premises network 110) based on input received via STBs 114.

Global DVR conflict resolution server 106 may identify global patterns of DVR conflict resolution from the viewing habits of multiple users (i.e., multiple customer premises networks 110). Global DVR conflict resolution server 106 may provide support for DVR conflict resolution in a customer premises network 110. Global DVR conflict resolution server 106 is described in further detail below with respect to FIG. 7.

Customer premises network 110 may include a subscriber home that receives video content from provider network 102. Customer premises network 110 may be associated with a customer account for the video service provider. As shown in FIG. 1, customer premises network 110 may include ONT 112, STB 114, local DVR conflict resolution device 116, TV 118, and remote control 120.

ONT 112 may receive data, e.g., on a fiber optic cable, and may transfer the data to the appropriate device in customer premises network 110, such as STB 114. Likewise, ONT 112 may receive data from any device in customer premises network 110 and may transmit the data to other devices in customer premises network 110, e.g., through a fiber optic cable. ONT 112 may provide customer premises network 110 with television access, Internet access, or telephone service, for example. Additionally, ONT 112 may output data to provider network 120 through network 130.

STB 114 may receive video content and output the video content to TV 118 for display. STB 114 may include a component (e.g., a cable card or a software application) that plugs into a host device (e.g., a personal computer, TV 118, a stereo system, etc.) that allows the host device to display video content. STB 114 may also be implemented as a home theater personal computer (HTPC), an optical disk player (e.g., digital video disk (DVD) or Blu-Ray™ disc player), a cable card, etc. STB 114 may receive commands from other devices in network 100, such as remote control 120. In one embodiment, STB 114 may include a microphone and/or a camera.

Local DVR conflict resolution device 116 may collect a local pattern of DVR conflict resolution from users, and analyze the local pattern of DVR conflict resolution to understand the preferences of the user and resolve DVR conflicts based on the local pattern and/or the global pattern of DVR conflict resolution (received from global DVR conflict resolution server 106), as described below with respect to FIGS. 4, 5, 6 and 8. In one implementation, local DVR conflict resolution device 116 may be implemented/integrated within STB 114.

TV 118 may include speakers as well as display 104. TV 118 may play content, for example, received from STB 114. While some embodiments described below may use TV 118 to view content, other embodiments may use any device (e.g., a computer or a mobile phone) to display/provide content.

Remote control 120 may issue commands for controlling other electronic devices, such as TV 118 or STB 114. Remote control 120, in conjunction with STB 114, may allow a user to interact with an application running on STB 114. In some instances, other types of devices (e.g., a keyboard, mouse, mobile phone, etc.) may be used instead of remote control 120.

Network 130 may include a wired or wireless network. Network 130 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 130 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 130 may also include a wireless satellite network.

In implementations described herein, systems and methods may resolve the conflict based on the users past preferences, viewing experiences, and other interests in the global system of the video service provider. The system may implement the conflict resolution based on local and/or global patterns of DVR conflict resolution without direct or immediate input from the user.

Figure 2:
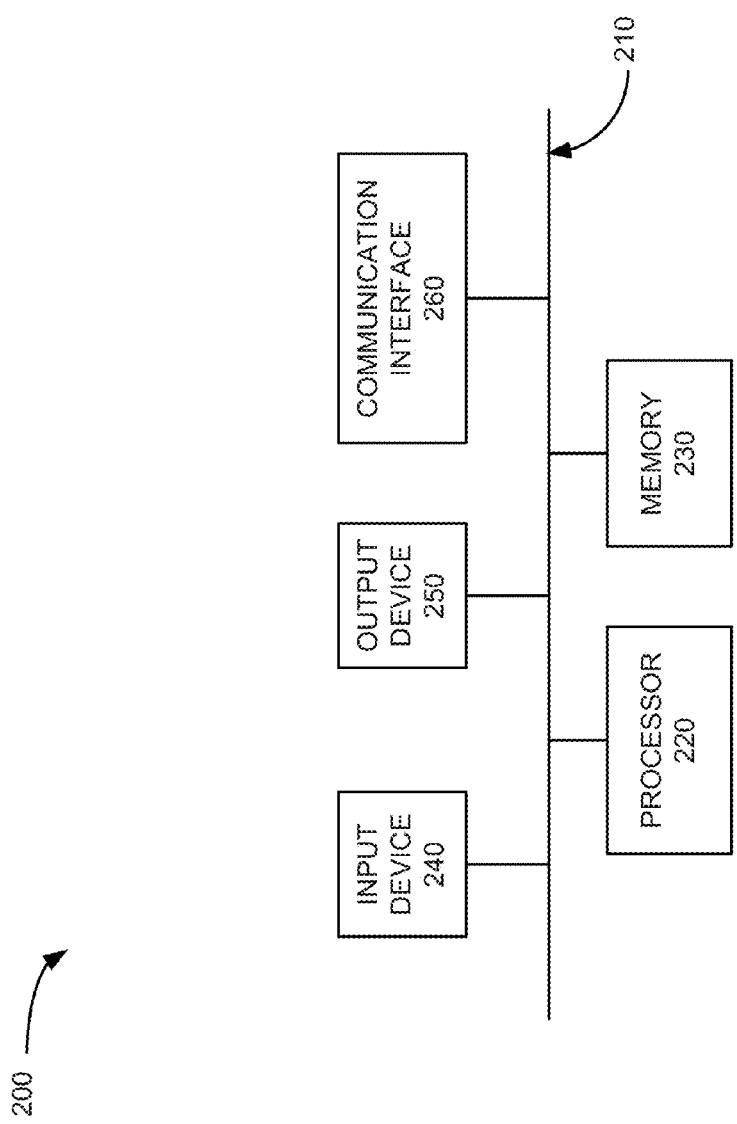
FIG. 2 is a block diagram of exemplary components of one or more of the devices of FIG. 1.

FIG. 2 is a diagram of exemplary components of a device 200. Each of content provider system 104, global DVR conflict resolution server 106, ONT 112, STB 114, local DVR conflict resolution device 116, TV 118, or remote control 120 may include one or more devices 200. As shown in FIG. 2, device 200 may include a bus 210, a processor 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 3:
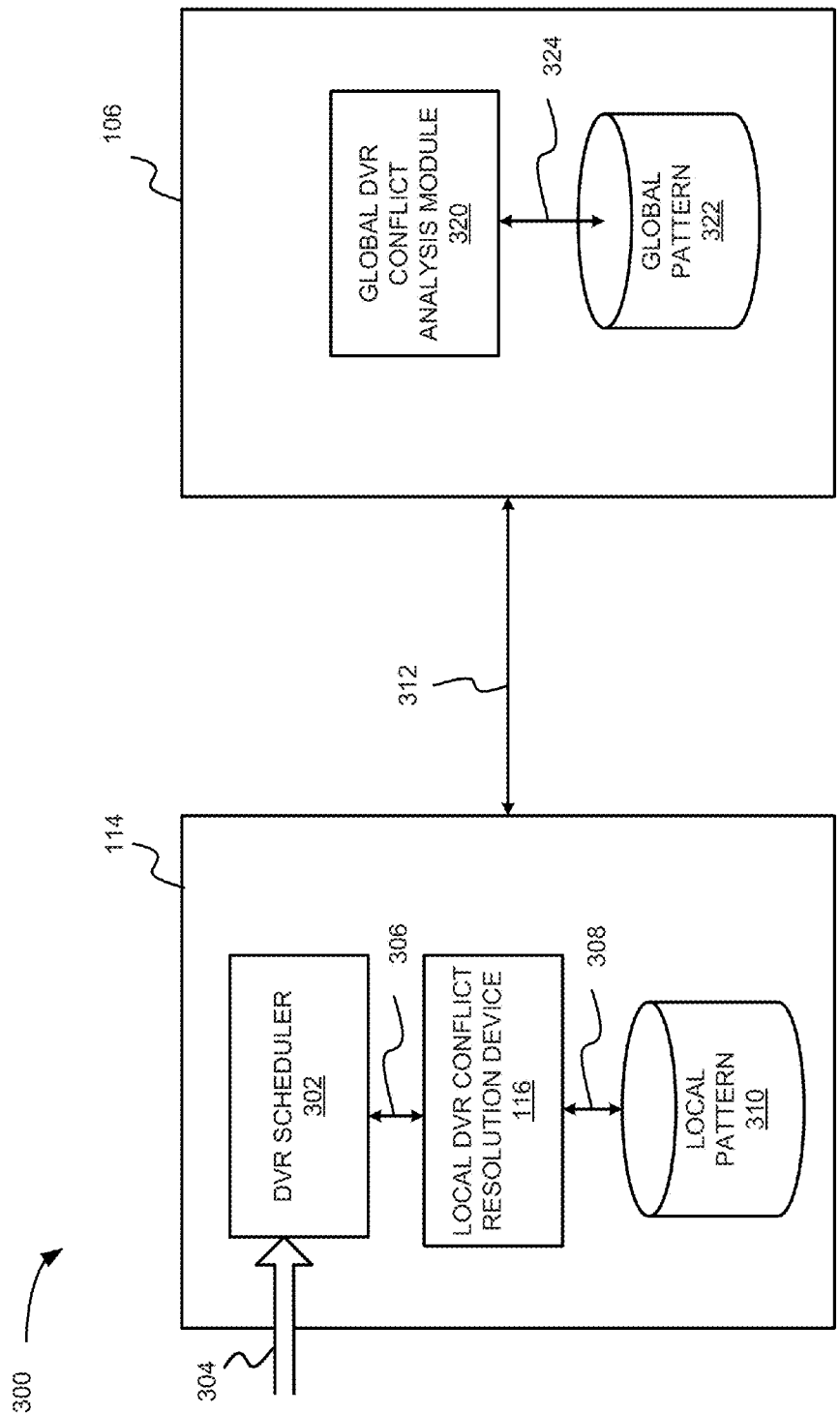
FIG. 3 is a block diagram of a portion of the network of FIG. 1 including components associated with digital video recorder (DVR) conflict resolution.

FIG. 3 is a functional block diagram of a DVR conflict resolution portion 300 of network 100. DVR conflict resolution portion 300 may include components of different networks that may interface with each other to provide DVR conflict resolution. As shown in FIG. 3, portion 300 may include STB 114, and global DVR conflict resolution server 106. STB 114 may include local DVR conflict resolution device 116 (which is shown integrated within STB 114), DVR scheduler 302 and local DVR conflict resolution pattern storage device (local pattern) 310. Global DVR conflict resolution server 106 may include global DVR conflict analysis module 320 and a global DVR conflict resolution pattern storage device (global pattern) 322.

As shown in FIG. 3, STB 114 may include a DVR scheduler 302. DVR scheduler 302 may implement DVR scheduling for STB 114, including determining times, channels and tuners that video programs are to be recorded. The video programs to be recorded may be selected by the user based on individual programs or episodes of a scheduled series or other preferences selected by the user. DVR scheduler 302 may identify multiple programs to be recorded based on instructions input by the user (e.g., via remote control 120 (not shown in FIG. 3)). DVR scheduler 302 may determine that more video programs are to be recorded at a particular time than there are tuners available and generate a conflicting DVR schedule indication 306. In one example, DVR scheduler 302 may provide an indication that a first video program scheduled to begin recording at a current time overlaps with a second video program scheduled to begin recording at a time before an end time of the first video program. DVR scheduler 302 may transmit conflicting DVR schedule indication 306 to local DVR conflict resolution device 116.

Local DVR conflict resolution device 116 may receive conflicting DVR schedule indication 306. Local DVR conflict resolution device 116 may send a request 308 to resolve the conflict based on a local pattern 310 of DVR conflict resolution, which may include users past preferences, viewing experiences, etc., for example as described with respect to FIGS. 4, 5 and 6. The request 308 may include the conflicting programs. If local DVR conflict resolution device 116 resolves the conflict, local DVR conflict resolution device 116 may then transmit the resolved schedule to DVR scheduler 302. If local DVR conflict resolution device 116 cannot resolve the conflict, local DVR conflict resolution device 116 may transmit an unresolved schedule indicator to DVR scheduler 302. DVR scheduler 302 may then send a conflicting DVR schedule indication 312 to global DVR conflict resolution server 106 to resolve the DVR conflict.

Global DVR conflict resolution server 106 may receive conflicting DVR schedule indication 312. Global DVR conflict resolution server 106 may include global DVR conflict analysis module 320 and global pattern 322. Global DVR conflict analysis module 320 may analyse the conflicting DVR schedule indication 312 to resolve the DVR conflict, for example as described with respect to FIG. 7. In one embodiment, global DVR conflict analysis module 320 may collect global viewing habits of users associated with a service provider and analyze the global viewing habits to determine a relative popularity of each video program. If global DVR conflict analysis module 320 resolves the conflict, global DVR conflict analysis module 320 may then transmit the resolved schedule to DVR scheduler 302. If global DVR conflict analysis module 320 cannot resolve the conflict, global DVR conflict analysis module 320 may transmit an unresolved schedule indicator to DVR scheduler 302.

Figure 4:
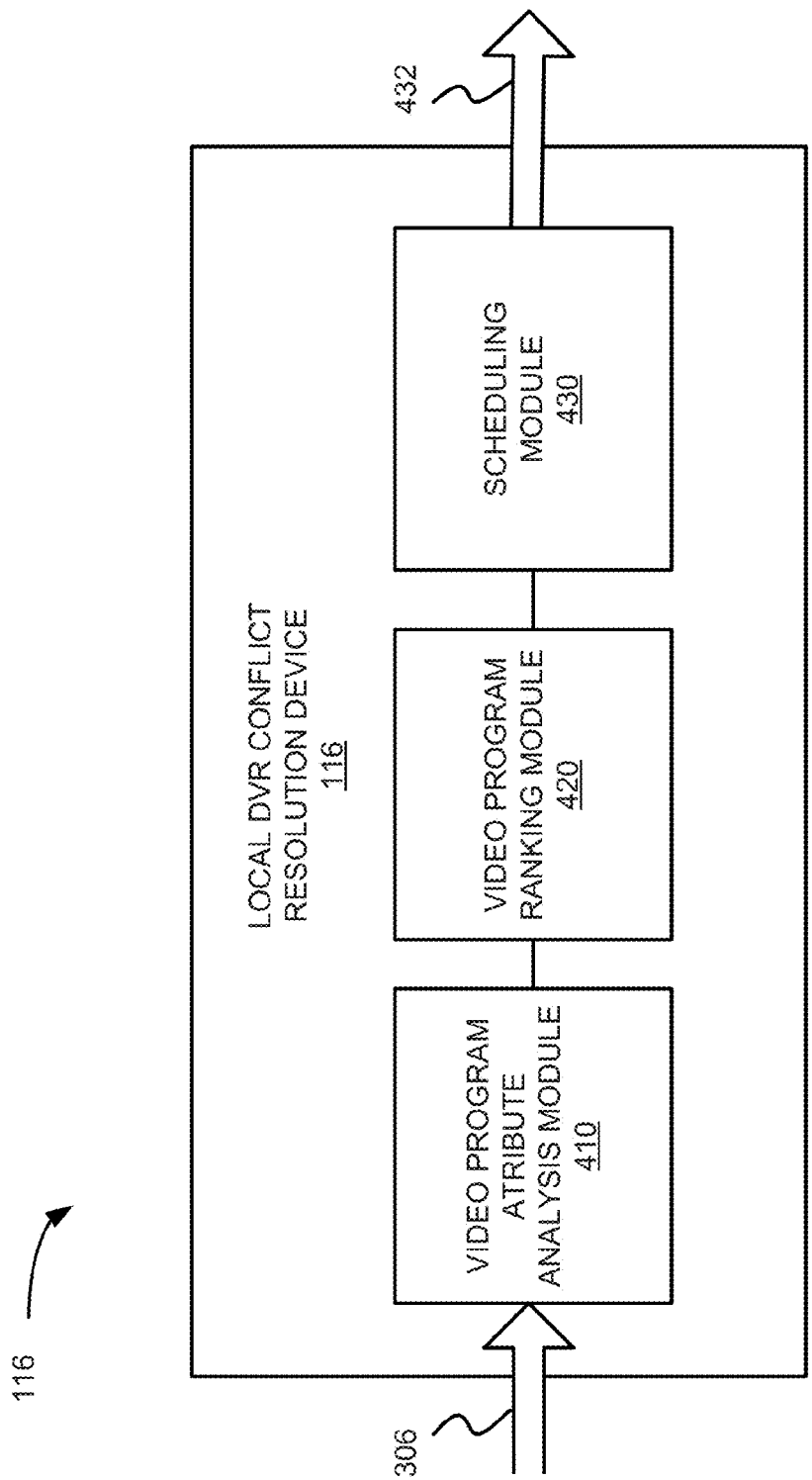
FIG. 4 is a functional block diagram of an exemplary set top box (STB) including a local DVR conflict resolution device.

FIG. 4 illustrates an exemplary functional block diagram of local DVR conflict resolution device 116. Device 116 may comprise software, hardware, or a combination of hardware and software. Local DVR conflict resolution device 116 may include a video program attribute analysis module 410, a video program ranking module 420 and a scheduling module 430. According to an embodiment, local DVR conflict resolution device 116 may be a component of a set top box, such as STB 114 described above. The configuration of components of device 116 illustrated in FIG. 4 is for illustrative purposes only. Other configurations may be implemented. Therefore, device 116 may include additional, fewer and/or different components than those depicted in FIG. 4. FIG. 4 is discussed in conjunction with FIG. 5 and FIG. 6, which illustrate a local DVR conflict resolution table 500 and an exemplary local DVR conflict resolution interface 600, respectively.

According to one embodiment, local DVR conflict resolution device 116 may receive conflicting DVR schedule indication 306 and determine whether an associated display (e.g., TV 118) is currently active and displaying a first video program, via, for instance, a signal provided by TV 118 to STB 114. Local DVR conflict resolution device 116 may record the first video program if the first video program corresponds to one of the scheduled conflicting video programs and maintain display of the first video program if the first video program does not correspond to one of the scheduled conflicting video programs. Local DVR conflict resolution device 116 may resolve the DVR conflict based on a remaining DVR resources. In other words, the user may be permitted to continue viewing whatever program they are currently viewing without interruption from the DVR recording process. If TV 118 is not currently on and displaying a video program, local DVR conflict resolution device 116 may switch tuners from currently tuned video programs to the scheduled video programs.

In any event, video program attribute analysis module 410 may receive conflicting DVR schedule indication 306. Conflicting DVR schedule indication 306 may indicate video programs that are scheduled for a particular time. Conflicting DVR schedule indication 306 may indicate that a conflict will occur when a time arrives for at least one of the conflicting programs to be recorded. For example, conflicting schedule indicator 306 may indicate that a video program that begins currently will overlap with another video program that begins in half an hour. Conflicting DVR schedule indication 306 may include a title of the video programs or other indicator that may allow video program attribute analysis module 410 to locate metadata for the conflicting video programs.

Video program attribute analysis module 410 may identify attributes associated with each of the conflicting video programs. For example, video program attribute analysis module 410 may search an associated database based on information received with the conflicting DVR schedule indication 306, such as the title of the video programs, to determine identifying attributes for each video program, such as a genre (e.g., comedy, romance, action, horror, etc.), actors, type of event (e.g., live, first broadcast), a type of program (broadcast television series, movie, music video, etc.), keywords, etc.

Video program ranking module 420 may compare the attributes of the conflicting video programs to identify differences in the attributes of the conflicting video programs. For example, video program ranking module 420 may identify that one program is a comedy while the other is a horror movie.

Video program ranking module 420 may analyze previous conflicts based on the identified differences in the conflicting video programs to identify a relative priority of each of the conflicting programs. For example, video program ranking module 420 may compare previous conflicts between horror movies and comedies.

As shown in FIG. 5, video program ranking module 420 may search an associated database to identify instances of the conflicting video programs that match entries in a table 500 of previous conflicts. Table 500 may include a first video program indicator 510, a second video program indicator 520, a time indicator 530 for when the conflict occurred (e.g., 4/20/13 7:30 PM), and a resolution of the conflict 540 (e.g., Record A). First video program indicator 510 and second video program indicator 520 may each identify attributes for each video program, such as a genre (e.g., comedy, action, horror, etc.), actors, type of event (e.g., live, sports event, first broadcast, television series, movie, music video, etc.), keywords, etc., as shown in FIG. 5. Although particular information is shown in FIG. 5 for illustrative purposes, it should be understood that additional or different information may be included in table 500. For example, in some implementations there may be additional video program indicators, corresponding to additional tuners. The listed attributes may also include a title or other identifier of a series or episode.

Referring back to FIG. 4, video program ranking module 420 may rank the types of video programs based on observed outcomes of previous conflicts. Further, video program ranking module 420 may rank the video programs based on a single attribute (e.g., genre) or a combination of attributes (e.g., genre, live or recorded, and actors, etc.). Video program ranking module 420 may provide a ranking for a first type of video program with respect to a second type of video program based on the outcomes of previous conflicts between the two types of video programs. For example, if live sports events are identified as consistently being selected over other types of video programs, video program ranking module 420 may assign live sports events a highest ranking. Alternatively, or additionally, video program ranking module 420 may rank the video programs based on the user's viewing habits, their DVR delete history, etc. Video program ranking module 420 may also rank video programs based on a history of DVR deletion. For example, video programs that are deleted without viewing may be assigned a lower rank that video programs that the user eventually views.

Scheduling module 430 may receive a ranking for each of the video programs and select the video program with the relatively higher ranking. Scheduling module 430 may send an indication of the selected video program that is to be recorded to DVR scheduler 302. If the ranking for each video program is the same, scheduling module 430 may indicate that the conflict was not resolved.

According to one embodiment, scheduling module 430 may identify whether a future opportunity (i.e., a rebroadcast of the video program) to record one of the scheduled video programs within a predetermined time exists. The predetermined time may be set by the user (e.g., within 48 hours). Scheduling module 430 may schedule the video program to be recorded at the future opportunity. Scheduling module 430 may record another of the video programs at a current time or alternatively, resolve the DVR conflict while excluding the video program that has been scheduled to be recorded at the future opportunity.

According to another embodiment, scheduling module 430 may determine whether a local pattern exists for an indication of the DVR conflict. If the local pattern exists, scheduling module 430 may resolve the DVR conflict based on the local pattern. If the local pattern does not exist, scheduling module 430 may provide a prompt for the user to resolve the conflict. In this manner, scheduling module 430 may update the user's preferences.

Figure 6:
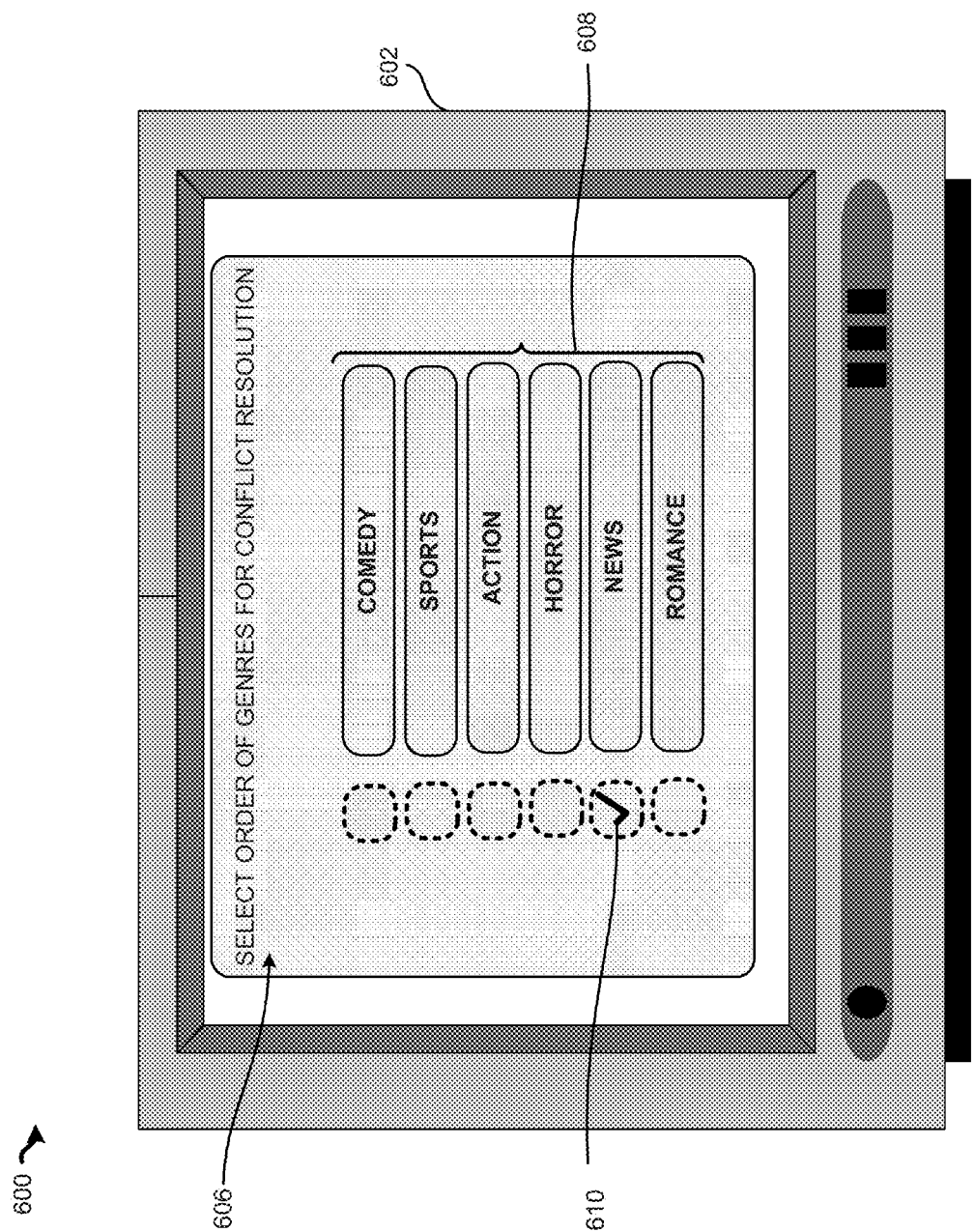
FIG. 6 is a diagram of an overview of an exemplary embodiment of a local DVR conflict resolution interface on a display associated with the STB.

Referring to FIG. 6, an exemplary embodiment of a local DVR conflict resolution interface 600 is shown that may be accessed on a display 602 associated with STB 114. As shown in FIG. 6, local DVR conflict resolution interface 600 may include a message 606 indicating that a user may select an order of attributes for determining conflict resolutions 608 (shown in FIG. 6 as an order of genres). Although particular attributes are shown, it should be understood that user control of conflict resolution may be determined based on different attributes (e.g., actors, etc.).

The order of conflict resolution by attribute may be presented to the user (e.g., select order of genres for conflict resolution). For example, video program ranking module 420 may provide a ranking for each attribute that may be visually displayed on local DVR conflict resolution interface 600. In some implementations, the user may change the order of attributes by selecting a particular attribute 610 and moving the attribute up in the order via remote control 120.

Figure 7:
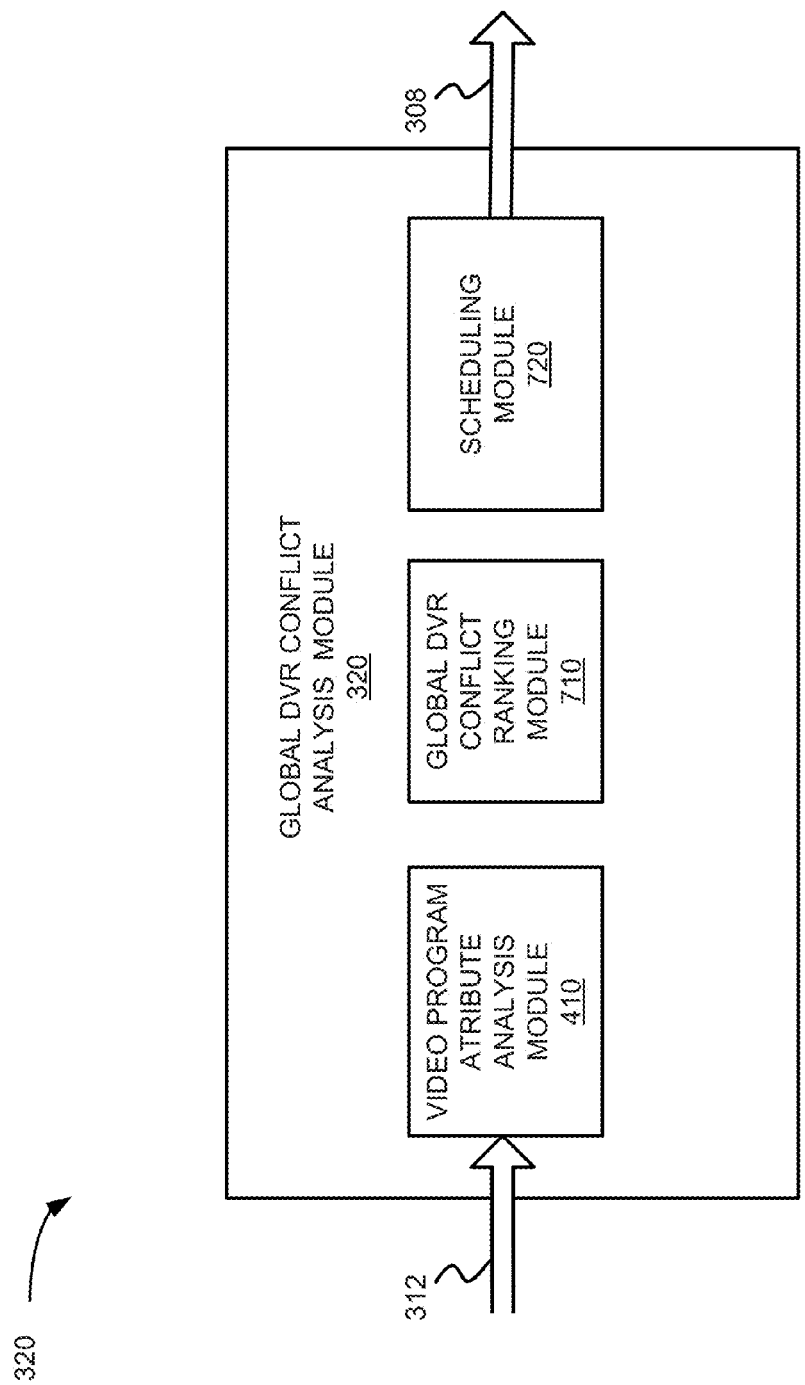
FIG. 7 is a functional block diagram of an exemplary global DVR conflict resolution server.

FIG. 7 is a diagram of exemplary functional components of global DVR conflict analysis module 320. In one implementation, the functions described in connection with FIG. 7 may be performed by one or more components of device 200 (FIG. 2). As shown in FIG. 7, global DVR conflict analysis module 320 may include video program attribute analysis module 410, a global DVR conflict ranking module 710, and a scheduling module 720.

As shown in FIG. 7, video program attribute analysis module 410 may receive conflicting DVR schedule indication 312. Video program attribute analysis module 410 may analyze conflicting DVR schedule indication 312 to determine attributes of conflicting video programs in a similar manner as described with respect to FIG. 4.

Global DVR conflict ranking module 710 may determine a global conflict ranking for different conflicting video programs based on observed resolutions to DVR conflicts received from different customers of the video service provider. Global DVR conflict ranking module 710 may aggregate the different popularity ranking measures to determine an overall popularity for each video program.

Scheduling module 720 may receive a ranking for each of the video programs and select the video program with the relatively higher ranking. Scheduling module 720 may send an indication of the video program that is to be recorded to DVR scheduler 302. If the ranking for each video program is the same, scheduling module 720 may indicate that the conflict was not resolved.

Figure 8:
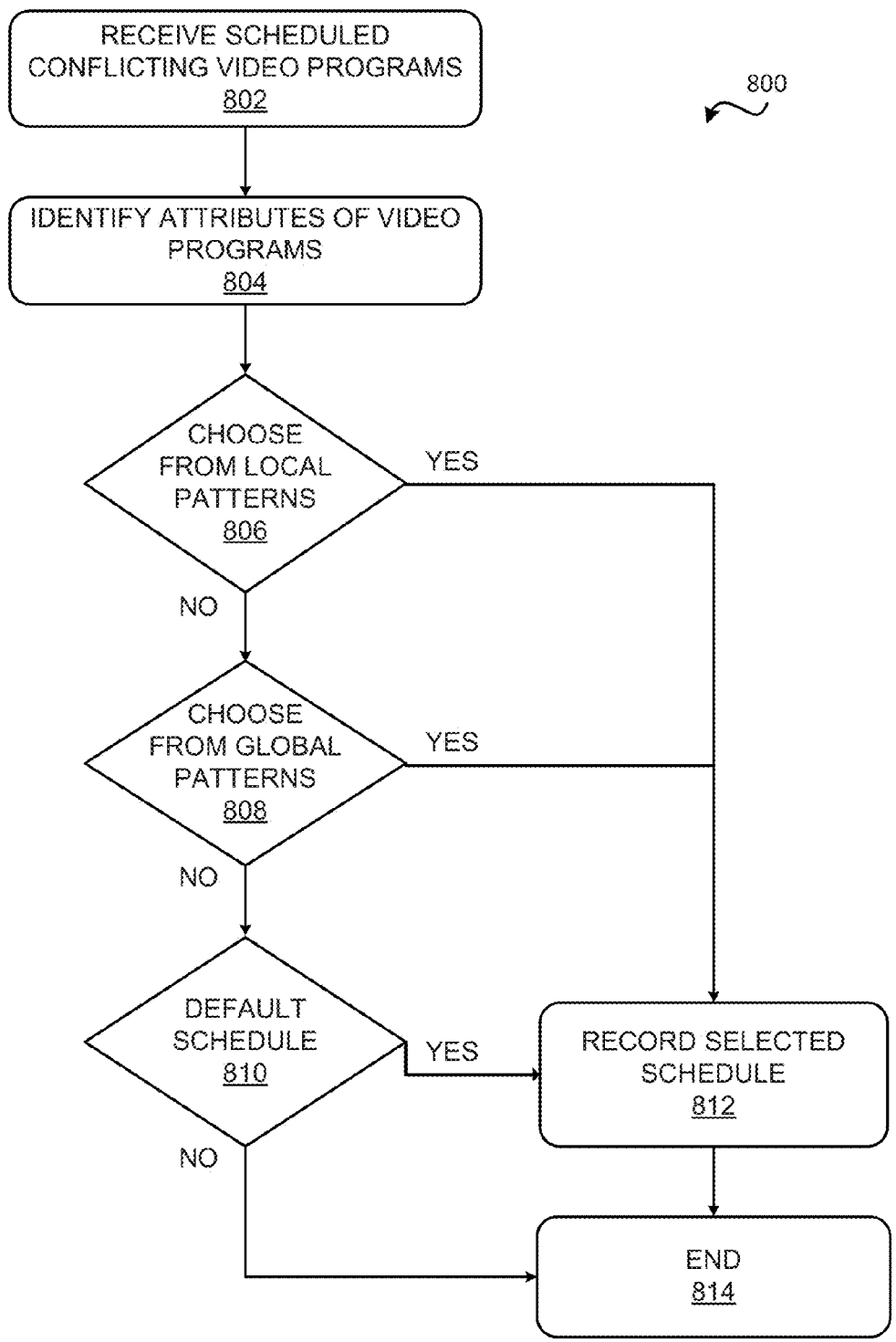
FIG. 8 is a flowchart of an exemplary process for implementing DVR conflict resolution according to an implementation described herein.

FIG. 8 is a flowchart of an exemplary process 800 for implementing DVR conflict resolution. Process 800 may execute in a device, for instance local DVR conflict resolution device 116 described in conjunction with FIG. 4. In another implementation, some or all of process 800 may be performed by another device or group of devices, including or excluding local DVR conflict resolution device 116. It should be apparent that the process discussed below with respect to FIG. 8 represents a generalized illustration and that other elements may be added or existing elements may be removed, modified or rearranged without departing from the scope of process 800.

At block 802, local DVR conflict resolution device 116 may receive scheduled conflicting video programs associated with a local user of STB 114. For example, a tuner conflict may arise when more video programs are scheduled to be recorded at a particular time than there are available DVRs. The user may have selected to automatically record one or more of the conflicting video programs based on the DVR conflict resolution (e.g., without receiving a prompt) or to receive a prompt for the local user to resolve the DVR conflict, in which instance the user may directly provide the resolution of the DVR conflict.

Local DVR conflict resolution device 116 may identify attributes of the conflicting video programs (block 804). The attributes may define or describe aspects of the video content. For example, local DVR conflict resolution device 116 may identify a genre, a title, an episode, actors, etc., of each of the conflicting video programs.

At block 806, local DVR conflict resolution device 116 may identify a local pattern of DVR conflict resolution associated with the local user based on the conflicting video programs. The local pattern may include types of video programs that match each of the conflicting programs and a resolution of the DVR conflict. For example, if two conflicting video programs (a first conflicting video program and a second video program) are scheduled to be recorded at a same time, local DVR conflict resolution device 116 may identify previous instances in which a video program that is of a same type as the first conflicting video program (e.g., defined by a particular attribute) is selected for DVR recording over a video program that is of a same type as the second conflicting video program. Local DVR conflict resolution device 116 may identify previous instances of DVR conflict resolution.

Local DVR conflict resolution device 116 may schedule (block 812) the video programs to be recorded based on the resolution associated with the local pattern (block 806—yes). For example, local DVR conflict resolution device 116 may select the more often chosen type of program to be recorded. According to an embodiment, local DVR conflict resolution device 116 may identify future scheduled instances of broadcasts of one of the conflicting programs and schedule the program to be recorded at that future instance while currently recording the other video program.

At block 808, local DVR conflict resolution device 116 may identify, in response to a determination that local patterns do not match the conflicting video programs (block 806—no), a global pattern of DVR conflict resolution associated with global users for the service provider based on the conflicting video programs. For example, local DVR conflict resolution device 116 may access a global pattern of conflict resolution provided by global DVR conflict resolution server 106. The global pattern may be determined based on the viewing habits of multiple users associated with the service provider. Video programs may be selected based on an overall popularity of each video program. Alternatively, the global pattern may be based on the DVR conflict resolution patterns of the users associated with the service provider. For example, the global pattern may be based on analysis of "head to head" conflicts between particular video programs received from other users (or all users) associated with the service provider.

Local DVR conflict resolution device 116 may schedule (block 812) the video programs to be recorded based on the resolution associated with the global pattern (block 808—yes). For example, local DVR conflict resolution device 116 may select the more popular video program to record.

At block 810, local DVR conflict resolution device 116 may identify, in response to a determination that global patterns do not match the conflicting video programs (block 808—no), a default pattern of DVR conflict resolution. For example, local DVR conflict resolution device 116 may access an associated storage device that includes the default pattern. The default pattern may include a last scheduled, an alternating video program, a highest rated video program, etc.

Local DVR conflict resolution device 116 may schedule (block 812) the video programs to be recorded based on the resolution associated with the default pattern (block 810—yes).

If the default pattern does not resolve the conflict (block 810—no), local DVR conflict resolution device 116 may end the conflict resolution process (block 814) and require input from the user.

Systems and/or methods described herein may resolve DVR conflicts based on a local pattern and/or a global pattern of DVR conflict resolution. The system may implement conflict resolution based on the local and/or global pattern without direct input from the user.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    storing local patterns of Digital Video Recorder (DVR) conflict resolution in a table, wherein the table stores a plurality of entries, and wherein each entry lists:
        attributes of a first video program,
        attributes of a second video program, wherein the first video program and the second video program were scheduled to be recorded at a same time, and
        an indication of whether a user associated with a user account of a video service chose to record the first video program or the second video program;
    receiving an indication of a DVR conflict associated with the user account, wherein the DVR conflict is caused by scheduling at least two video programs to be recorded at overlapping times;
    identifying, by a processor, attributes of each of the at least two video programs;
    searching, by the processor, the table to identify an entry, of the plurality of entries, that lists attributes similar to the attributes of the at least two video programs;
    determining, by the processor, that the table does not include the entry that lists attributes similar to the attributes of the at least two video programs;
    identifying, based on determining that the table does not include the entry that lists attributes similar to the attributes of the at least two video programs, a global pattern of DVR conflict resolution, wherein the global pattern lists attributes of video programs with a previous DVR recording time conflict and an indication of which video program other customer accounts of the video service chose to record, wherein the other customer accounts do not include the user account; and
    scheduling at least one of the at least two video programs to be recorded based on the global pattern of DVR conflict resolution in response to a determination that the at least two video programs match the global pattern of DVR conflict resolution.

2. The computer-implemented method of claim 1, further comprising:
automatically recording one or more of the at least two video programs based on the scheduling.

3. The computer-implemented method of claim 1, further comprising:
collecting indicators of local viewing habits of the user account; and
analyzing the indicators of the local viewing habits to determine a preference of the user account.

4. The computer-implemented method of claim 1, further comprising:
identifying whether a future opportunity to record one of the at least two video programs within a predetermined time exists;
scheduling the one of the at least two video programs to be recorded at the future opportunity; and
recording another of the at least two video programs at a current time.

5. The computer-implemented method of claim 1, wherein receiving the indication of the DVR conflict further comprises:
receiving an indication that a third video program scheduled to begin recording at a current time overlaps with a fourth video program scheduled to begin recording at a time before an end time of the third video program.

6. The computer-implemented method of claim 1, wherein identifying the global pattern of DVR conflict resolution further comprises:
collecting global viewing habits of multiple users of the other customer accounts associated with a service provider; and
analyzing the global viewing habits to determine a relative popularity of each of the at least two video programs.

7. The computer-implemented method of claim 1, further comprising:
identifying one or more of an alternating schedule, a schedule based on time of creation, or a highest rated video program.

8. The computer-implemented method of claim 1, further comprising:
determining whether an associated display is currently active and displaying a third video program;
determining whether the third video program corresponds to one of the at least two video programs;
recording the third video program when the third video program corresponds to one of the at least two video programs;
maintaining display of the third video program when the third video program does not correspond to one of the at least two video programs; and
resolving the DVR conflict based on remaining DVR resources.

9. The computer-implemented method of claim 1, further comprising:
identifying previous instances of DVR conflict resolution associated with the user account.

10. The computer-implemented method of claim 1, wherein identifying the attributes of each of the at least two video programs further comprises:
identifying one or more of actors, a genre, a type of event, or key words associated with each of the at least two video programs.

11. The computer-implemented method of claim 1, further comprising:
scheduling the recording based on a time that the user associated with the user account is likely to select to view each of the at least two video programs.

12. The computer-implemented method of claim 1, further comprising:
providing a graphical user interface configurable to receive input from the user to alter an order of priority for resolving DVR conflicts for the at least two video programs based on the attributes of the at least two video programs.

13. The computer-implemented method of claim 1, further comprising:
identifying a local pattern of DVR conflict resolution based on a history of DVR deletion associated with the user account.

14. A device comprising:
a memory to store a plurality of instructions; and
a processor configured to execute one of more of the instructions stored in the memory to:
store local patterns of Digital Video Recorder (DVR) conflict resolution in a table, wherein the table stores a plurality of entries, and wherein each entry lists:
attributes of a first video program,
attributes of a second video program, wherein the first video program and the second video program were scheduled to be recorded at a same time, and
an indication of whether a user associated with a user account of a video service chose to record the first video program or the second video program;
receive an indication of a DVR conflict associated with the user account, wherein the DVR conflict is caused by scheduling at least two video programs to be recorded at overlapping times;
identify attributes of each of the at least two video programs;
search the table to identify an entry, of the plurality of entries, that lists attributes similar to the attributes of the at least two video programs;
determine that the table does not include the entry that lists attributes similar to the attributes of the at least two video programs;
identify, based on determining that the table does not include the entry that lists attributes similar to the attributes of the at least two video programs, a global pattern of DVR conflict resolution, wherein the global pattern lists attributes of video programs with a previous DVR recording time conflict and an indication of which video program other customer accounts of the video service chose to record, wherein the other customer accounts do not include the user account; and
and
schedule at least one of the at least two video programs to be recorded based on the global pattern of DVR conflict resolution in response to a determination that the at least two video programs match the global pattern of DVR conflict resolution.

15. The device of claim 14, wherein the processor is further configured to:
determine whether a local pattern of DVR conflict resolution exists for the indication of the DVR conflict; and
provide a prompt for the user account to resolve the conflict in response to a determination that the local pattern of DVR conflict resolution does not exist for the indication of the DVR conflict.

16. The device of claim 14, wherein the processor is further configured to:
collect indicators of local viewing habits of the user account; and
analyze the indicators of local viewing habits to determine a preference of the user account.

17. The device of claim 14, wherein when identifying the global pattern of DVR conflict resolution, the processor is further configured to:
collect global viewing habits of users of the other customer accounts associated with a service provider; and
analyze the global viewing habits to determine a relative popularity of each of video program.

18. The device of claim 14, wherein the processor is further configured to provide a graphical user interface configurable to receive input from the user to alter an order of priority for resolving DVR conflicts for the at least two video programs based on the attributes of the at least two video programs including one or more of actors, a genre, a type of event, or key words associated with the at least two video programs.

19. A non-transitory computer-readable medium including instructions to be executed by a processor, the instructions including one or more instructions, which when executed by the processor, for causing the processor to:
store local patterns of Digital Video Recorder (DVR) conflict resolution in a table, wherein the table stores a plurality of entries, and wherein each entry lists:
attributes of a first video program,
attributes of a second video program, wherein the first video program and the second video program were scheduled to be recorded at a same time, and
an indication of whether a user associated with a user account of a video service chose to record the first video program or the second video program;
receive an indication of a DVR conflict associated with the user account, wherein the DVR conflict is caused by scheduling at least two video programs to be recorded at overlapping times;
identify attributes of each of the at least two video programs;
search the table to identify an entry, of the plurality of entries, that lists attributes similar to the attributes of the at least two video programs;
determine that the table does not include the entry that lists attributes similar to the attributes of the at least two video programs;
identify, based on determining that the table does not include the entry that lists attributes similar to the attributes of the at least two video programs, a global pattern of DVR conflict resolution, wherein the global pattern lists attributes of video programs with a previous DVR recording time conflict and an indication of which video program other customer accounts of the video service chose to record, wherein the other customer accounts do not include the user account; and
schedule at least one of the at least two video programs to be recorded based on the global pattern of DVR conflict resolution in response to a determination that the at least two video programs match the global pattern of DVR conflict resolution.

20. The non-transitory computer-readable medium of claim 19, where the one or more instructions further includes instructions to:
identifying a local pattern of DVR conflict resolution based on a history of DVR deletion associated with the user account.

* * * * *